US008650895B2

(12) United States Patent
Zapotocky et al.

(10) Patent No.: US 8,650,895 B2
(45) Date of Patent: Feb. 18, 2014

(54) METHOD FOR CONSTRUCTING AIR CONDITIONING SYSTEMS WITH UNIVERSAL BASE UNITS

(75) Inventors: Jiri Zapotocky, Velky Osek (CZ); Miroslav Vavrik, Stary Kolin (CZ); Thomas Reitz, Idstein (DE)

(73) Assignee: Thermo King Corporation, Minneapolis, MN (US)

( * ) Notice: Subject to any disclaimer, the term of this patent is extended or adjusted under 35 U.S.C. 154(b) by 143 days.

(21) Appl. No.: 13/358,074

(22) Filed: Jan. 25, 2012

(65) Prior Publication Data
US 2013/0185939 A1 Jul. 25, 2013

(51) Int. Cl.
*B60H 1/32* (2006.01)

(52) U.S. Cl.
USPC .................. 62/244; 62/200; 62/239

(58) Field of Classification Search
USPC ............. 62/77, 200, 239, 241, 244, 298, 299, 62/326, 510; 165/151; 29/890.35
See application file for complete search history.

(56) References Cited

U.S. PATENT DOCUMENTS

| | | |
|---|---|---|
| 3,315,488 A | 4/1967 | Lind |
| 3,848,428 A | 11/1974 | Rieter, Jr. |
| 3,862,549 A | 1/1975 | Fernandes |
| 4,043,143 A | 8/1977 | Fluder et al. |
| 4,051,691 A | 10/1977 | Dawkins |
| 4,127,162 A | 11/1978 | Braver |
| 4,134,275 A | 1/1979 | Erickson et al. |
| 4,201,064 A | 5/1980 | Krug et al. |
| 4,217,764 A | 8/1980 | Armbruster |
| 4,592,207 A | 6/1986 | Rummel |
| 4,607,497 A | 8/1986 | Ferdows et al. |
| 4,622,831 A | 11/1986 | Grupa |
| 4,641,502 A | 2/1987 | Aldrich et al. |
| 4,679,616 A | 7/1987 | Ferdows et al. |
| 4,727,728 A | 3/1988 | Brown |
| 4,732,011 A | 3/1988 | Haiya |
| 4,748,825 A | 6/1988 | King |
| 4,787,210 A | 11/1988 | Brown |
| 4,885,916 A | 12/1989 | Arndt |
| 4,905,478 A | 3/1990 | Matsuda et al. |

(Continued)

FOREIGN PATENT DOCUMENTS

| | | |
|---|---|---|
| JP | 11208241 A | 8/1999 |
| KR | 748138 B1 | 8/2007 |
| KR | 10-0685100 B1 | 1/2011 |

OTHER PUBLICATIONS

International Search Report and Written Opinion for Application No. PCT/US2012/070484 dated Apr. 16, 2013 (10 pages).

*Primary Examiner* — Allana Lewin
*Assistant Examiner* — Emmanuel Duke
(74) *Attorney, Agent, or Firm* — Michael Best & Friedrich LLP

(57) ABSTRACT

A method of constructing modular air conditioning systems for vehicles includes providing identical universal base units that can be built out into a variety of different types of air conditioning systems. Each base unit includes a frame, a condenser, an evaporator coil, and a blower, and has open-circuit refrigerant connection lines so as to be non-operational without a completion kit. Completion kits are provided in a variety of configurations, including at least two of a simple connection kit, a front box kit, and a compressor kit, each of which is connectable with a universal base unit to form a unique type of air conditioning system.

14 Claims, 14 Drawing Sheets

(56) References Cited

U.S. PATENT DOCUMENTS

| | | |
|---|---|---|
| 4,909,046 A | 3/1990 | Johnson |
| 4,926,655 A | 5/1990 | King |
| 4,945,977 A | 8/1990 | D'Agaro |
| 4,977,750 A | 12/1990 | Metcalfe |
| 4,982,583 A | 1/1991 | Matsuda et al. |
| 5,005,372 A * | 4/1991 | King ........................ 62/244 |
| 5,123,257 A | 6/1992 | Anderson et al. |
| 5,184,474 A | 2/1993 | Ferdows |
| 5,277,036 A | 1/1994 | Dieckmann et al. |
| 5,444,990 A | 8/1995 | McGill, III et al. |
| 5,482,109 A | 1/1996 | Kunkel |
| 5,485,878 A | 1/1996 | Derks |
| 5,605,055 A | 2/1997 | Salgado |
| 5,632,330 A | 5/1997 | Drucker et al. |
| 5,732,565 A | 3/1998 | Ramakrishnan et al. |
| 5,924,300 A | 7/1999 | Fromm et al. |
| 5,934,097 A | 8/1999 | Karl |
| 6,105,383 A | 8/2000 | Reimann et al. |
| 6,282,912 B1 | 9/2001 | Mannerheim |
| 6,295,826 B1 | 10/2001 | Lee |
| 6,357,249 B1 | 3/2002 | Robinson et al. |
| 6,415,620 B1 | 7/2002 | Ferdows |
| 6,718,784 B1 | 4/2004 | Bushnell |
| 6,742,343 B2 | 6/2004 | Matonog et al. |
| 6,745,586 B1 | 6/2004 | Reimann et al. |
| 6,751,975 B1 | 6/2004 | Reimann |
| 6,761,038 B1 | 7/2004 | Bushnell et al. |
| 6,763,668 B1 | 7/2004 | Bushnell et al. |
| 6,763,669 B1 | 7/2004 | Bushnell et al. |
| 6,763,670 B1 | 7/2004 | Bushnell et al. |
| 6,772,833 B2 | 8/2004 | Auer et al. |
| 6,796,132 B1 | 9/2004 | Hille et al. |
| 6,886,358 B2 | 5/2005 | Hille et al. |
| 6,915,651 B2 | 7/2005 | Hille et al. |
| 6,925,826 B2 | 8/2005 | Hille et al. |
| 6,983,619 B2 | 1/2006 | Hille et al. |
| 7,007,498 B2 | 3/2006 | Hansen |
| 7,051,544 B2 | 5/2006 | Hille et al. |
| 7,096,925 B2 | 8/2006 | Bracciano |
| 7,254,956 B2 | 8/2007 | Matonog et al. |
| 7,775,062 B2 | 8/2010 | Blomquist |
| 2002/0073723 A1 | 6/2002 | Hoos |
| 2003/0042004 A1 | 3/2003 | Novotny et al. |
| 2005/0158197 A1* | 7/2005 | Park et al. ........................ 417/505 |
| 2006/0037339 A1 | 2/2006 | Hassel et al. |
| 2008/0314072 A1 | 12/2008 | Plank et al. |
| 2009/0217689 A1 | 9/2009 | Chakiachvili et al. |
| 2010/0024458 A1* | 2/2010 | Schmitt et al. ........................ 62/239 |
| 2010/0031686 A1 | 2/2010 | Platt |
| 2010/0229585 A1 | 9/2010 | Bradford et al. |

* cited by examiner

METHOD FOR CONSTRUCTING AIR CONDITIONING SYSTEMS WITH UNIVERSAL BASE UNITS

BACKGROUND

The present invention relates to air conditioning systems, including those mounted on vehicle rooftops (i.e., buses, temperature-controlled delivery vehicles, etc.). There is an inherent need for manufacturers of these types of air conditioning systems to tailor the various system components to meet the particular specifications of a variety of vehicles. Thus, the number of different parts among unique systems, even though the majority of the unique systems are quite similar, can be rather high in order to meet all of the various customer needs. One partial solution to this problem, found in U.S. Pat. No. 7,051,544, is to manufacture only one type of air conditioning module and provide a plurality of the modules in a number configured to meet the specified cooling need of each different vehicle. However, this results in an extreme duplication of parts for a large vehicle (i.e., when 4, 6, or 8 modules, each containing all the basic components of a self-contained air conditioning system, are required for a single vehicle). Obviously, this significantly increases the assembly effort, and furthermore, presents greater statistical opportunity for failure on a given vehicle.

In addition, it may be necessary to provide not only differently-sized components (to meet a specified cooling need), but wholly different types of modules within air conditioning systems to meet the growing needs of vehicle manufacturers. For example, it is common for the refrigerant in a rooftop air conditioning system to be compressed by a compressor located in the vehicle's engine compartment and driven directly from the engine. However, it may be desirable or necessary to position the compressor directly in the rooftop air conditioning unit in some vehicles. Furthermore, it may be desirable or necessary in some vehicles to incorporate electrical power conversion components into the air conditioning system to convert AC power directly from an alternator into usable DC power for running the electrical components of the air conditioning system. A small cooling system may also be provided to cool the electrical power conversion components. Yet another common variation involves providing a separately-controlled secondary air conditioning system for a dedicated portion of the vehicle (e.g., a cab or driver's quarters versus the primary system that is used for a cargo or passenger area). Of course, one universal frame and housing structure could be designed to be capable of receiving all of the possible hardware for all of the various permutations of air conditioning systems, but this results in a costly waste of materials and space in most if not all of the realistic air conditioning system configurations to be produced. Rather, the conventional approach has been to produce standalone designs for each different type of air conditioning system in an attempt to make the most efficient use of materials. However, this results in each different type of air conditioning system being very unique from the others (e.g., alternate routing of fluid tubing, individualized frames and covers configured for a particular group of components). Examples of these are shown in FIGS. 1A-1D.

FIG. 1A illustrates a first air conditioning system 20A including a frame that supports a condenser, an evaporator coil, a heater, and a blower, some or all of which are at least partially enclosed by a plurality of covers 24A. The air conditioning system 20A is configured to be coupled with a remote compressor (e.g., a compressor located in the engine bay of a vehicle and driven by the engine), but is otherwise provided with a complete internal closed-loop fluid circuit.

FIG. 1B illustrates a second air conditioning system 20B including a frame that supports a condenser, an evaporator coil, a heater, and a blower, some or all of which are at least partially enclosed by a plurality of covers 24B. The air conditioning system 20B further includes an electrically-driven hermetic compressor, which is on-board as opposed to the air conditioning system 20A of FIG. 1A which operates with a remote compressor. Therefore, the air conditioning system 20B of FIG. 1B is provided with a complete internal closed-loop fluid circuit. Although the system 20B of FIG. 1B may be identical in cooling capacity to the system 20A of FIG. 1A, at least the respective frames and the respective covers 24A, 24B are required to be unique from each other to accommodate the alternate configurations.

FIG. 1C illustrates a third air conditioning system 20C including a frame that supports a condenser, an evaporator coil, a heater, and a blower, some or all of which are at least partially enclosed by a plurality of covers 24C. Like the air conditioning system 20B of FIG. 1B, the system 20C of FIG. 1C includes an on-board electrically-driven hermetic compressor and a complete internal closed-loop fluid circuit. However, the system 20C further includes a power conversion unit configured to receive a variable AC input from an alternator (i.e., vehicle engine-driven alternator) and provide a predetermined DC output to the on-board compressor. Although the system 20C of FIG. 1C may be identical in cooling capacity to the system(s) 20A, 20B of FIGS. 1A and 1B, at least the respective frames and the respective covers 24A, 24B, 24C are required to be unique from each other to accommodate the alternate configurations.

FIG. 1D illustrates a fourth air conditioning system 20D including a frame that supports a condenser, an evaporator coil, a heater, and a blower, some or all of which are at least partially enclosed by a plurality of covers 24D. Like the system 20A of FIG. 1A, the system 20D of FIG. 1D is configured to be coupled with a remote compressor (e.g., a compressor located in the engine bay of a vehicle and driven by the engine), but is otherwise provided with a complete internal closed-loop fluid circuit. Unlike the system 20A of FIG. 1A, the system 20D of FIG. 1D further includes a secondary air conditioning system 28D with a secondary cooling coil, a secondary heater, and a secondary blower. The secondary air conditioning system 28D is configured to provide dedicated temperature control to a designated vehicle portion, such as a driver's quarters or "cab". Although the system 20D of FIG. 1D may be identical in cooling capacity to the system 20A of FIG. 1A, at least the respective frames and the respective covers 24A, 24D are required to be unique from each other to accommodate the alternate configurations. Thus, a constant struggle exists for efficiently designing any type of "universal" air conditioning system.

SUMMARY

In one aspect, the invention provides a method of constructing modular air conditioning systems for vehicles. A plurality of identical universal base units are provided, each including a frame, a condenser, an evaporator coil, and a blower. Each universal base unit includes open-circuit refrigerant lines such that the universal base units are themselves non-operational. At least two types of completion kits are provided. One connection kit may be a simple connection kit connectable with any of the plurality of universal base units and including open-circuit refrigerant connection lines complementary with the open-circuit refrigerant lines of a universal base unit to define continuous flow paths therebetween, the simple connection kit equipping a universal base unit to operate with a remote compressor. Another connection kit may be a front box kit connectable with any of the plurality of universal base units and including open-circuit refrigerant connection lines complementary with the open-circuit refrigerant lines of a universal base unit to define continuous flow paths therebetween, the front box kit including a secondary cooling coil, and a secondary blower. Another connection kit may be a compressor kit connectable with any of the plurality of universal base units and including open-circuit refrigerant connection lines complementary with the open-circuit refrigerant lines of a universal base unit to define continuous flow paths therebetween, the compressor kit including an electrically-driven compressor. A first one of the provided completion kits is attached onto a first one of the plurality of universal base units to construct a first air conditioning system of a first type, and a second one of the provided completion kits is attached onto a second one of the plurality of universal base units to construct a second air conditioning system of a second type.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1A:
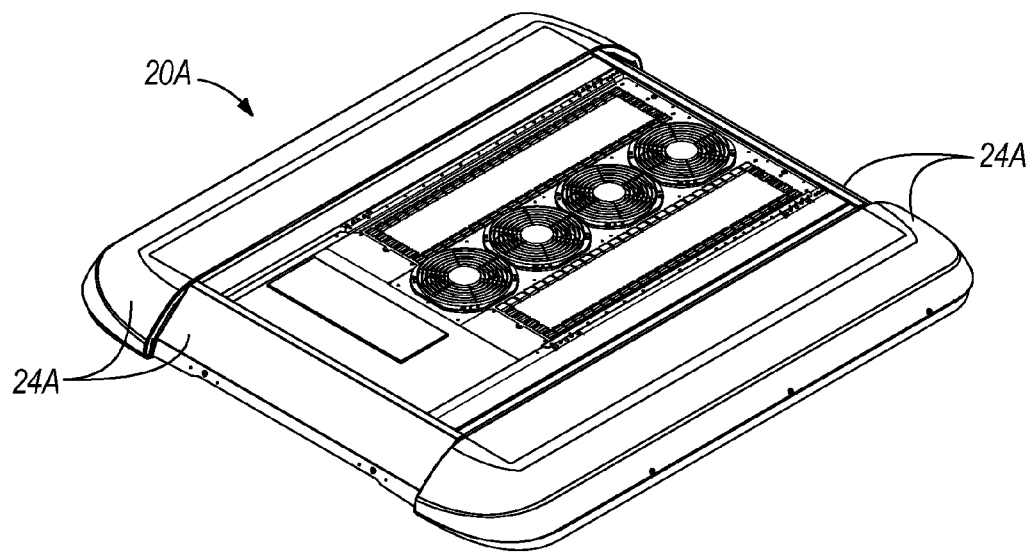
FIG. 1A is a perspective view of a first prior art air conditioning system.
Figure 1B:
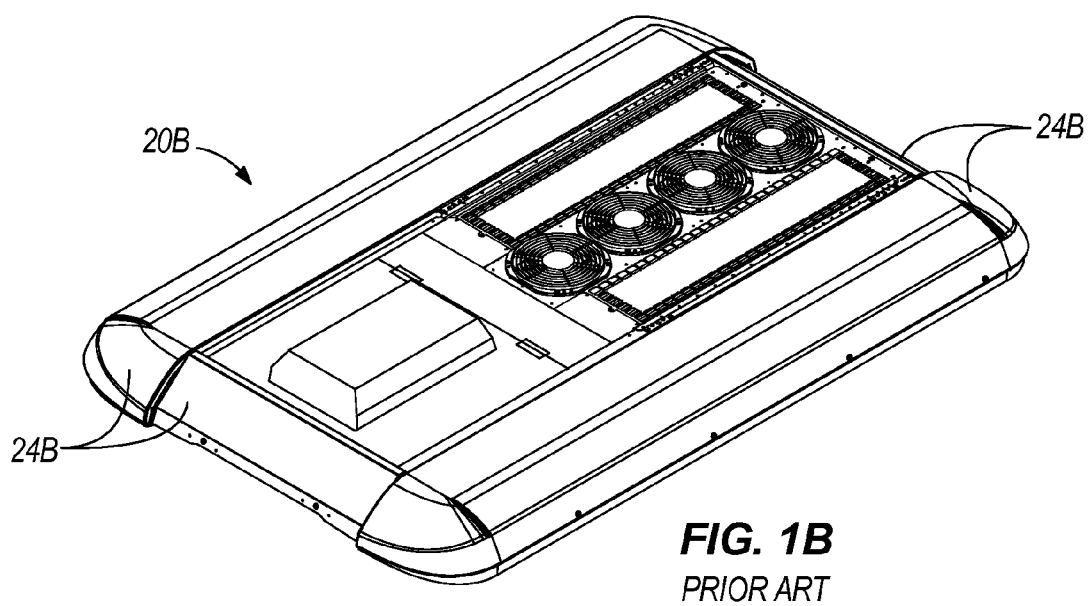
FIG. 1B is a perspective view of a second prior art air conditioning system.
Figure 1C:
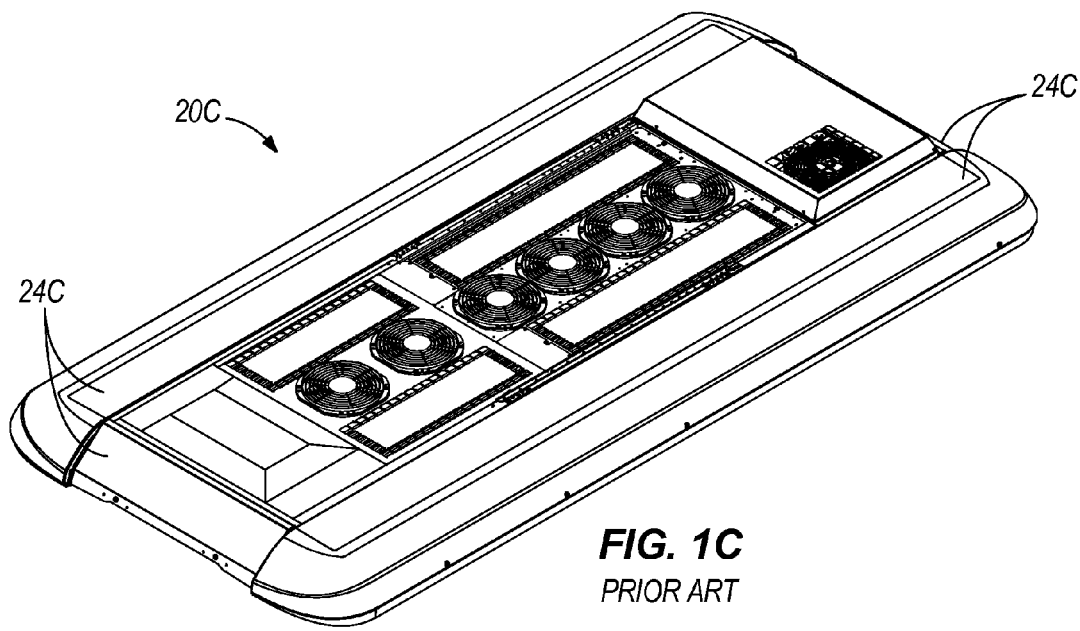
FIG. 1C is a perspective view of a third prior art air conditioning system.
Figure 1D:
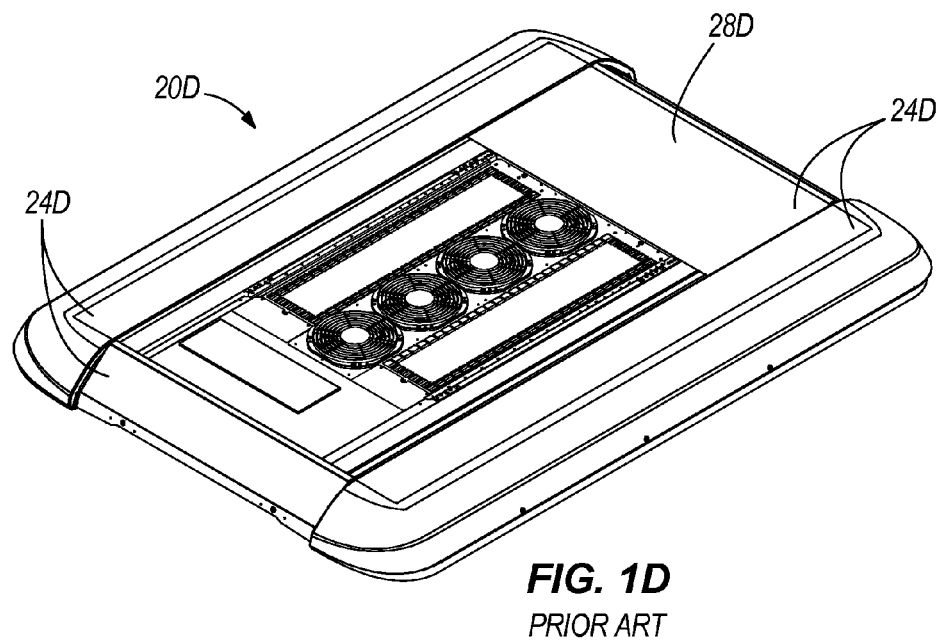
FIG. 1D is a perspective view of a fourth prior art air conditioning system.
Figure 2:
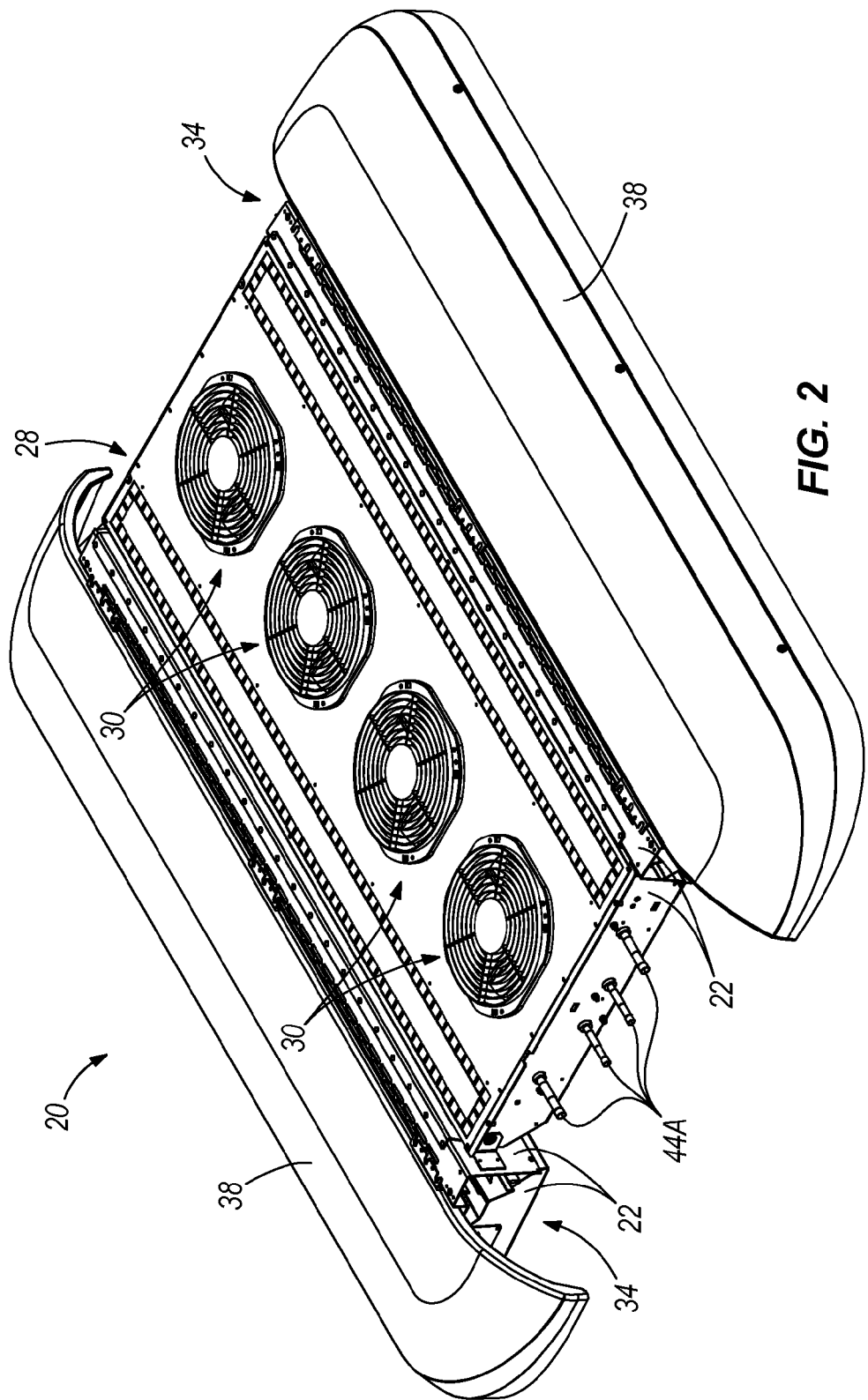
FIG. 2 is a perspective view of a universal base unit configured to mate with any one of a plurality of completion kits for constructing any one of a plurality of different types of air conditioning systems.
Figure 3:
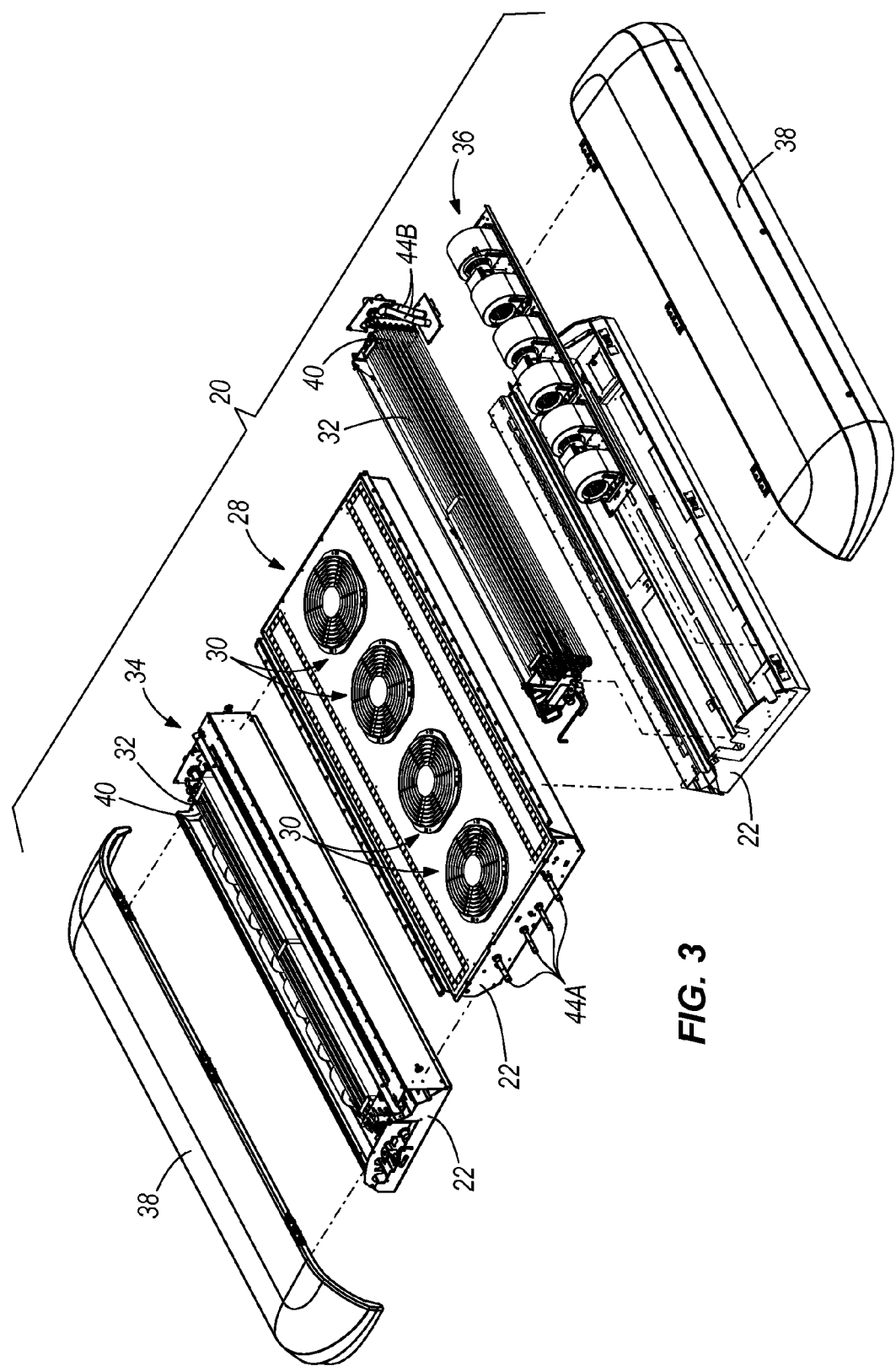
FIG. 3 is an exploded assembly view of the universal base unit of FIG. 2.

In order to limit the amount of unique parts and assembly operations among a family of different types of air conditioning systems, a universal base unit 20 is provided as shown in FIGS. 2 and 3. As described herein, a family of air conditioning systems may have the same or similar cooling capacity, but have fundamentally different operational configurations and characteristics. The universal base unit 20 includes a frame 22 (e.g., condenser and evaporator frame or base members), a condenser assembly 28 including one or more condenser coils and one or more condenser fans 30, one or more evaporator coils 32, one or more fans or blowers 36, and a pair of side covers 38. In the illustrated construction, the universal base unit 20 includes two evaporator assemblies 34 coupled on opposite sides of the condenser 28, each evaporator assembly 34 including an evaporator coil 32 and a series of blowers 36 mounted in a corresponding base frame 22. Other arrangements are provided in other constructions. Optionally, the universal base unit 20 can include one or more heaters (e.g., an electric resistance heater, or a heater coil 40 adjacent each evaporator coils 3 (FIG. 3) for circulating a heating fluid such as engine coolant). It should be particularly noted that the universal base unit 20 further includes a plurality of open-circuit (i.e., open-ended) refrigerant lines 44A (e.g., condenser coil inlets and outlets) such that the universal base unit 20 itself is non-operational, even when coupled with a remote compressor. Rather, as described in further detail below, the universal base unit 20 requires the attachment of a completion kit thereto in order to define a closed-loop fluid circuit. The closed-loop fluid circuit can include a compressor that is located either on-board the universal base unit 20 (i.e., mechanically coupled thereto) or remotely from the universal base unit 20. If one or more heater coils 40 are provided, the universal base unit 20 also includes a plurality of open-circuit (i.e., open-ended) coolant lines 44B, which can be coupled to an engine water pump to circulate engine coolant, and may also be interconnected with each other with additional connection lines 79. Without connecting the open-circuit coolant lines 44B, the universal base unit 20 is non-operational to provide heating, even when coupled with the engine water pump.

Figure 4:
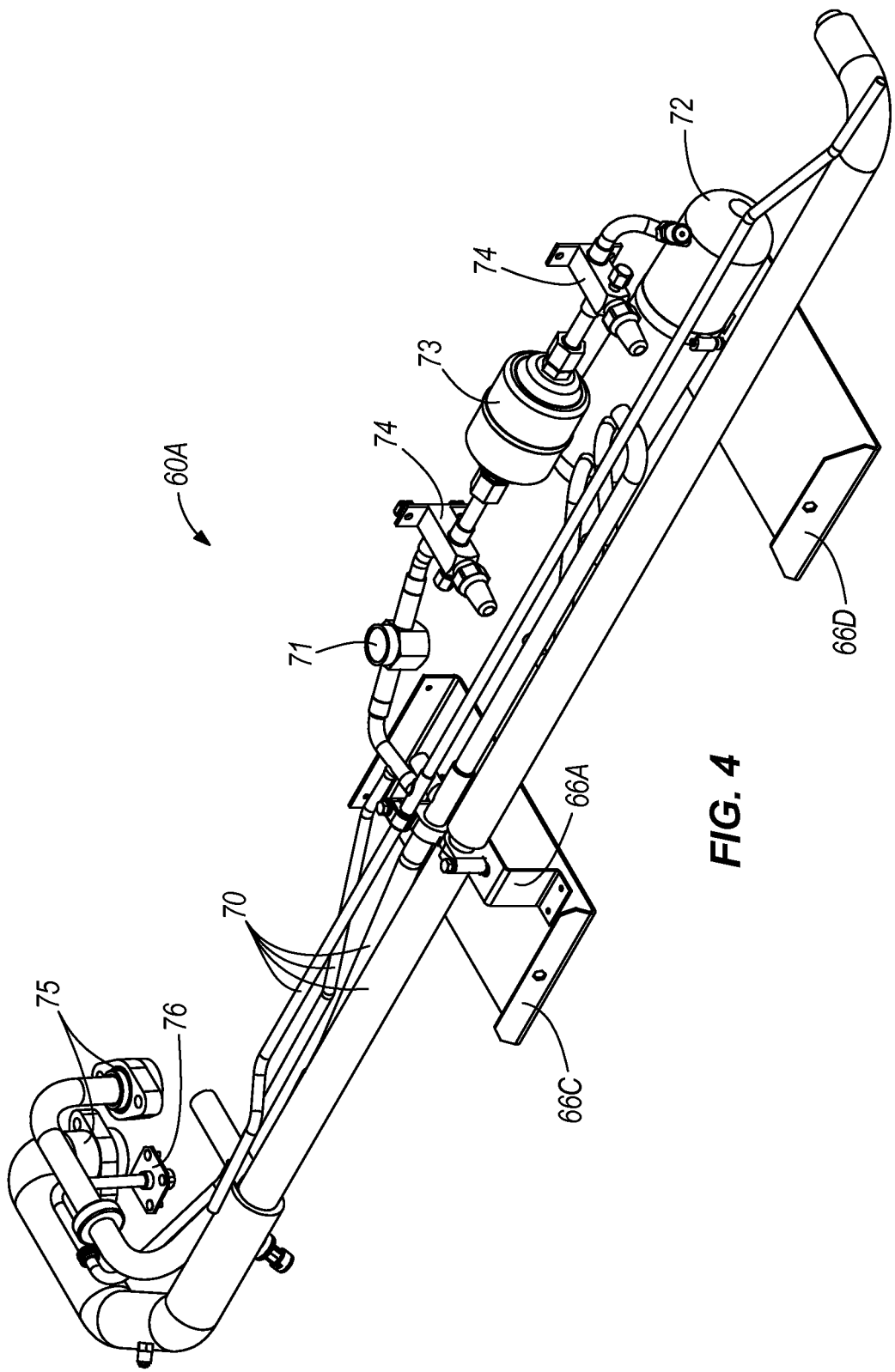
FIG. 4 is a perspective view of a group of components making up a simple connection kit for attachment onto the universal base unit of FIGS. 2-3.
Figure 5:
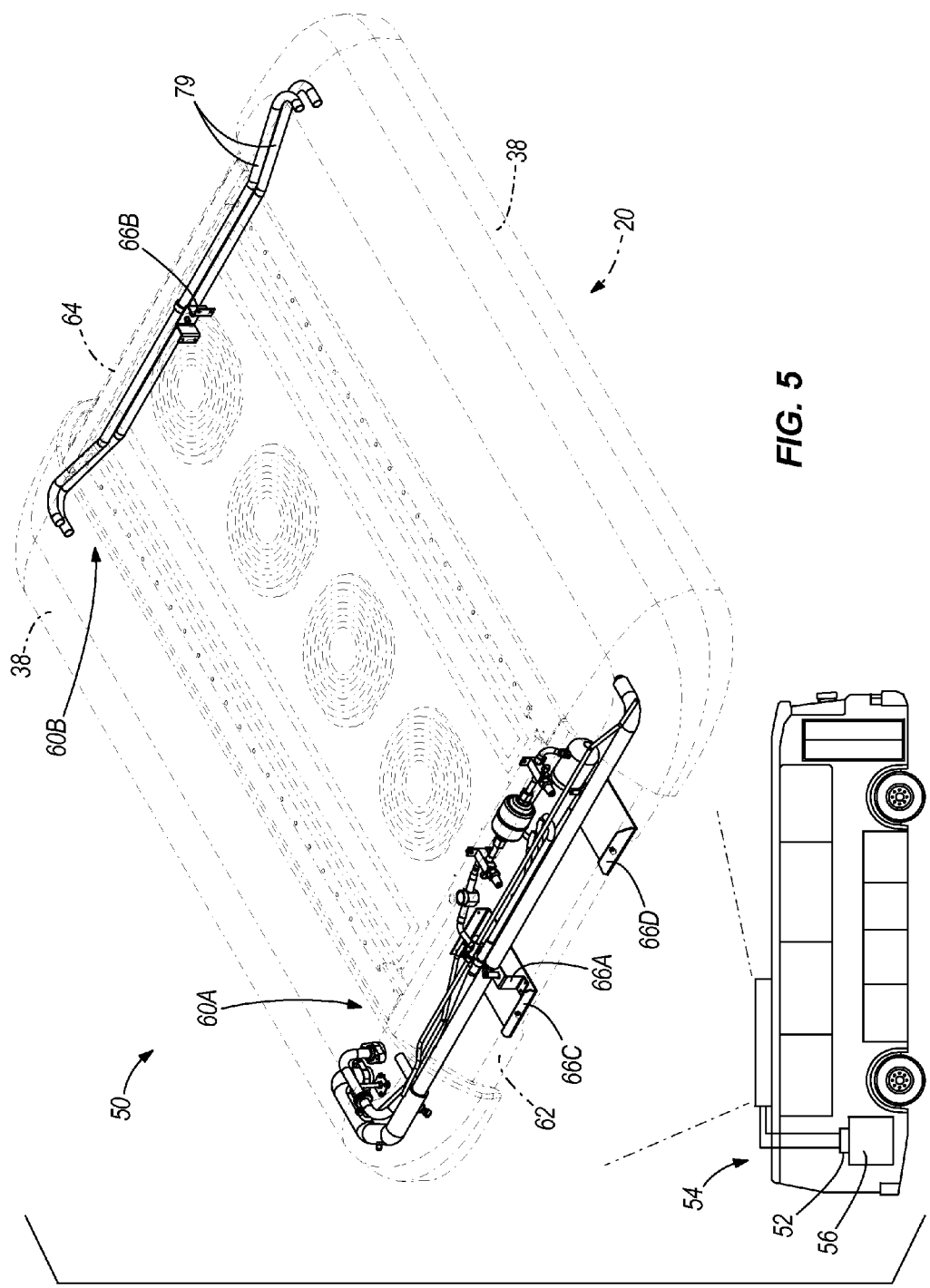
FIG. 5 is a perspective view of the simple connection kit assembled with the universal base unit of FIGS. 2-3 to form an air conditioning system operable with a remote compressor.

A first completion kit is described with reference to FIGS. 4 and 5. The completion kit of FIGS. 4 and 5 is a simple connection kit 50 for mating with the open-circuit lines 44A, 44B of the universal base unit 20 and providing an attachment for connection with a remote compressor, such as a compressor 52 located in the engine compartment of a vehicle 54 (e.g., mass transit vehicle such as a bus) and driven by the vehicle engine 56. As shown in FIGS. 4 and 5, the simple connection kit 50 includes at least one connection assembly 60A, 60B, a first cover 62, a second cover 64, and a frame including one or more frame members 66A-D. A first connection assembly 60A is a refrigerant connection assembly fluidly coupling a pair of evaporator coils 32 of the universal base unit 20 via the open-circuit refrigerant lines 44A. If the universal base unit 20 is configured to provide heating via heated fluid as shown in the illustrated construction, the simple connection kit 50 further includes a second connection assembly 60B fluidly coupling a pair of heater coils 40 (FIG. 3). If the universal base unit 20 is not provided with fluid-circulating heater coils 40, the simple connection kit 50 may be provided with only the refrigerant connection assembly 60A. In the illustrated construction, the refrigerant connection assembly 60A includes a plurality of refrigerant tubes 70 in addition to a sight glass 71, a tank receiver 72, a filter-drier 73 (flanked by a pair of valves 74), and a pair of fittings 75 for coupling to the remote compressor 52. It should be appreciated that the exact type of components and their arrangement as illustrated is not limiting, and alternate types of components may be provided or the components rearranged as known to one of ordinary skill in the art. The refrigerant connection assembly 60A also includes a front box connection 76, which can be used to couple the universal base unit 20 with a small remotely-located air conditioning unit (e.g., dashboard "front box" for driver). A front box air conditioning unit is not illustrated, but can include heating and/or cooling coils and an air control (e.g., flapper or damper) device. Front box units do not include their own compressor or condenser. Rather, if a front box unit is required, it is coupled via the front box connection 76 to exchange refrigerant with the rooftop unit. The heating fluid connection assembly 60B includes connection lines 79 for coupling the heater coils 40 of the universal base unit 20 via the open-circuit lines 44B.

In the illustrated construction, the frame includes a bracket 66A coupled with (e.g., clamped onto) the refrigerant connection assembly 60A and a bracket 66B coupled with (e.g., clamped onto) the heating fluid connection assembly 60B. The brackets 66A, 66B are coupled with the frame 24 of the universal base unit 20 so that the refrigerant connection assembly 60A and the heating fluid connection assembly 60B are supported by the frame 24 of the universal base unit 20. In the illustrated construction, the frame of the simple connection kit 50 includes a pair of additional brackets 66C, 66D adjacent the refrigerant connection assembly 60A that couple the first cover 62 to the frame 24 of the universal base unit 20. For example, the additional brackets 66C, 66D are fastened to an end (e.g., on or adjacent an exposed external end face) of the universal base unit frame 24 in the illustrated construction. The bracket 66A for the refrigerant connection assembly 60A is coupled indirectly to the universal base unit frame 24 via at least one of the additional brackets 66C, 66D (bracket 66C in FIGS. 4 and 5). On an opposing end of the universal base unit 20, the bracket 66B for the heating fluid connection assembly 60B is coupled directly to the end of the frame 24 (e.g., on or adjacent an exposed external end face). The second cover 64 can be coupled to the frame 24 directly, through the bracket 66B for the heating fluid connection assembly 60B, or through another bracket or mounting arrangement that fixes the position of the second cover 64 relative to the universal base unit 20.

Attachment of the simple connection kit 50 onto the universal base unit 20 to construct an air conditioning system of a first type as shown in FIG. 5 is described below. The refrigerant connection assembly 60A is coupled with the open-circuit refrigerant lines 44A of the universal base unit 20 to define continuous flow paths therebetween. When heating is provided by fluid-circulating heater coils 40 rather than electric heating, the connection lines 79 of the heating fluid connection assembly 60B are coupled with the open-circuit lines 44B of the universal base unit 20. In the illustrated construction, the refrigerant connection assembly 60A and the heating fluid connection assembly 60B are coupled with the respective open-circuit lines 44A, 44B at opposing ends of the universal base unit 20. The brackets 66A-D are mounted to the frame 24 of the universal base unit 20 to support the connection assemblies 60A, 60B. The first and second covers 62, 64 are mounted to abut the universal base unit 20 and cover the refrigerant connection assembly 60A and the heating fluid connection assembly 60B, respectively. In some constructions, only a single cover may be used. The cover(s) of the simple connection kit 50 may be configured to integrate with (i.e., conform to or abut with) the side covers 38 of the universal base unit 20.

Figure 6:
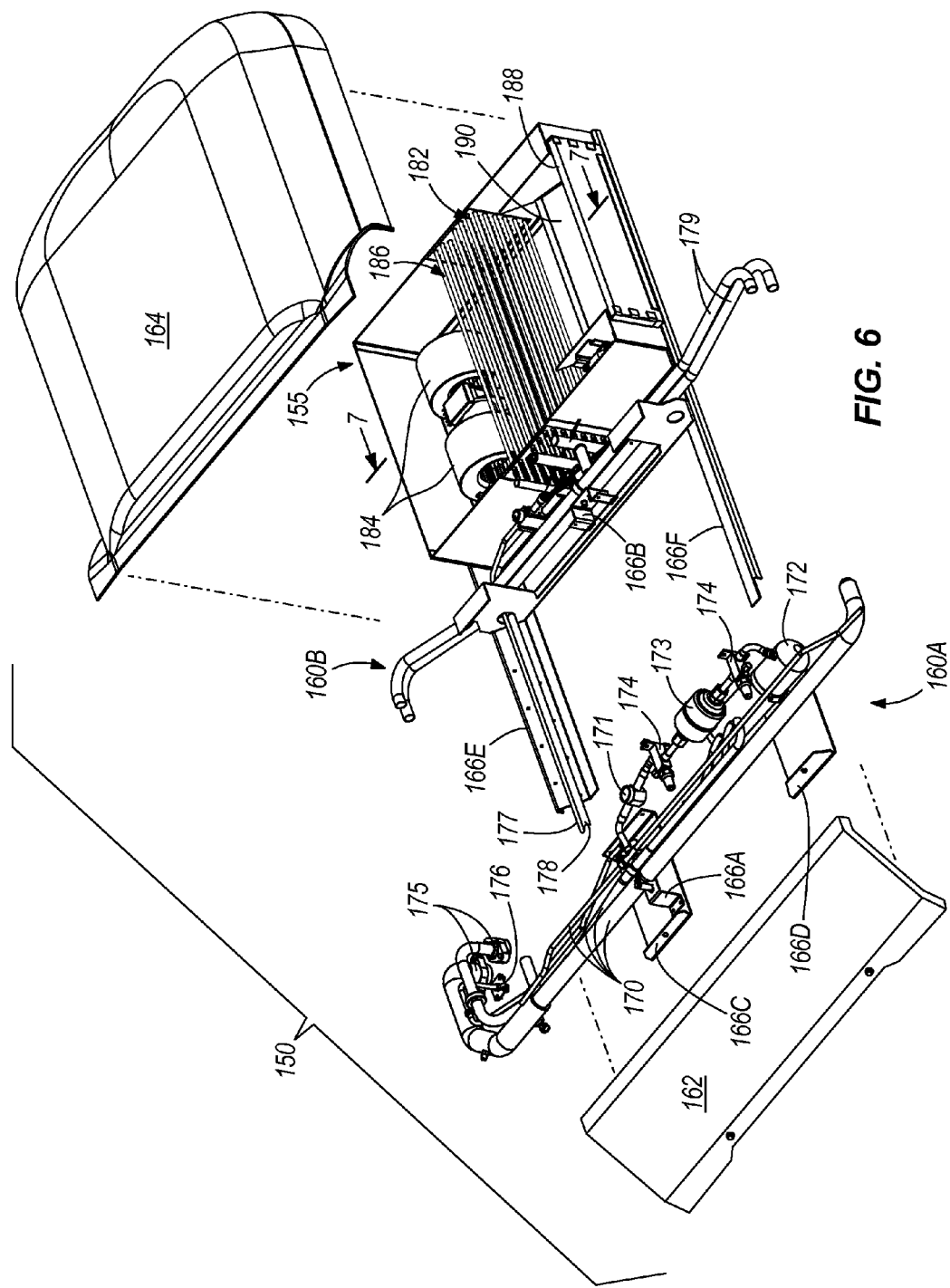
FIG. 6 is a perspective view of a group of components making up a front box kit for attachment onto the universal base unit of FIGS. 2-3.
Figure 7:
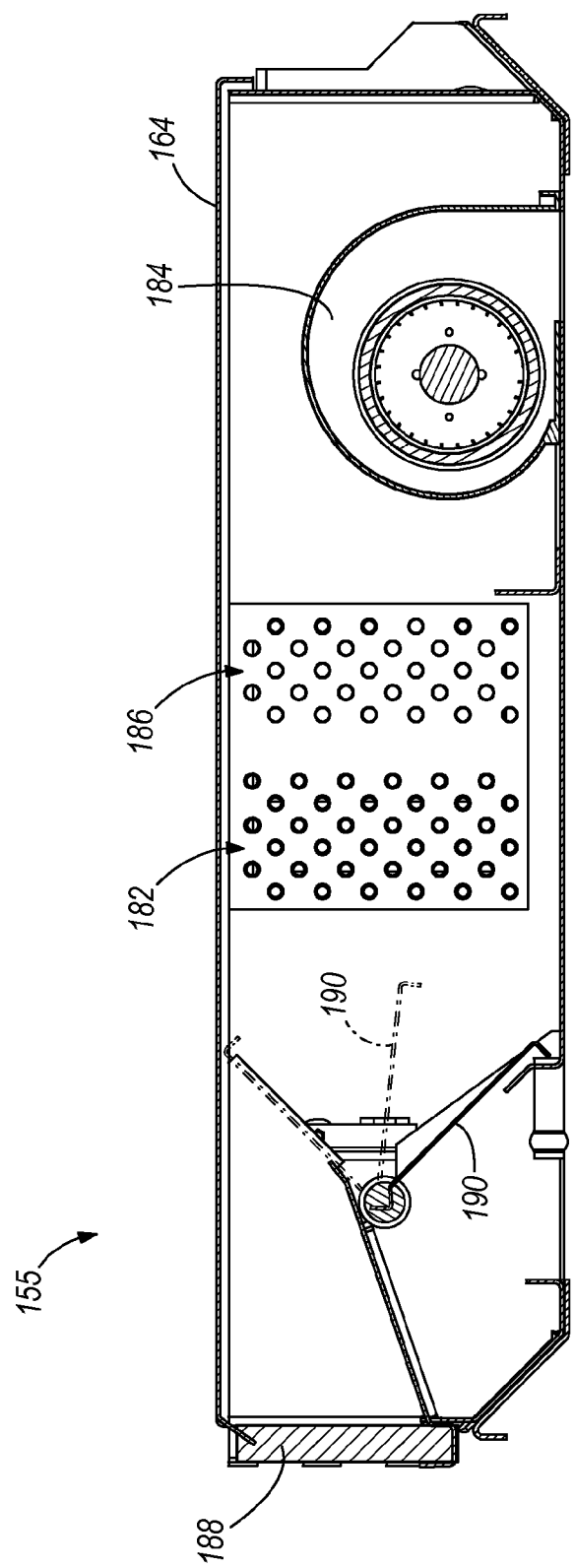
FIG. 7 is a cross-sectional view of the front box kit, taken along line 7-7 of FIG. 6.
Figure 8:
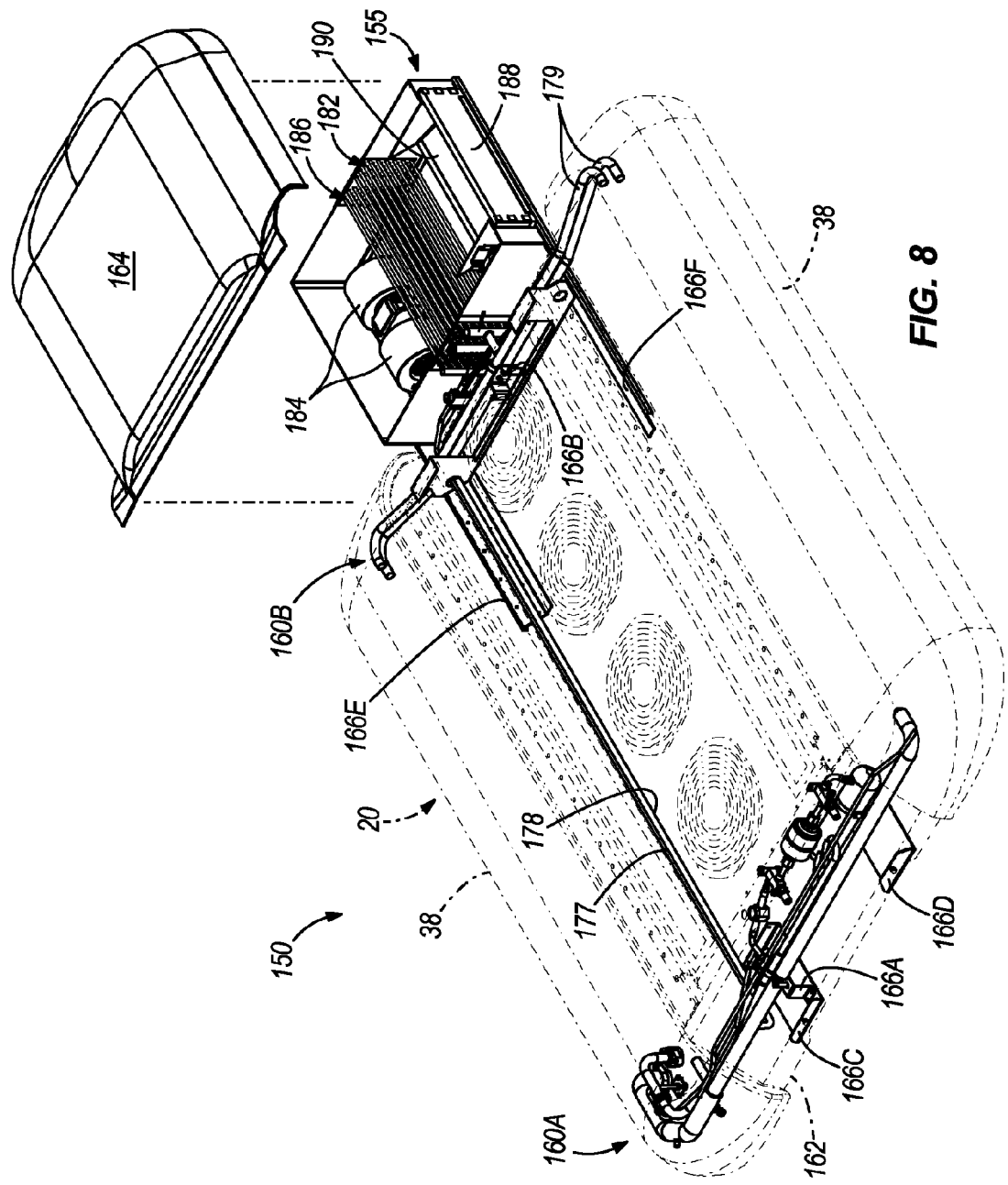
FIG. 8 is a perspective view of the front box kit assembled with the universal base unit of FIGS. 2-3 to form an air conditioning system operable to separately condition a main air flow and a secondary air flow.

A second completion kit is described with reference to FIGS. 6-8. The completion kit of FIGS. 6-8 is a front box kit 150 for not only mating with the open-circuit fluid lines 44A, 44B of the universal base unit 20 and providing an attachment for connection with a remote compressor, but also for equipping the air conditioning system with a separate front box 155 to control the air temperature of a secondary air flow (e.g., dedicated temperature control to a designated vehicle portion, such as a driver's quarters or "cab") in addition to the primary air flow flowing through the universal base unit 20. Like the air conditioning system of FIG. 5, the air conditioning system utilizing the front box kit 150 can be configured to be coupled to the compressor 52 located in the engine compartment of the vehicle 54 (e.g., mass transit vehicle such as a bus) and driven by the vehicle engine 56. As shown in FIGS. 6-8, the front box kit 150 includes at least one connection assembly 160A, 160B, a first cover 162, a second cover 164, a secondary cooling coil (i.e., evaporator coil) 182, a secondary blower 184, and a frame including one or more frame members 166A-F supporting at least the secondary cooling coil 182 and the secondary blower 184. As illustrated, the front box kit 150 can optionally also include a secondary heater 186 (e.g., an electric resistance heater or a heater coil(s) for circulating heating fluid such as heated engine coolant) positioned in the front box 155. The front box 155 of the kit 150 further includes a fresh air filter 188 and a movable damper 190, which in the illustrated construction is pivotable about axis A to control the flow of air through the front box 155, letting one or both of return air and fresh air to flow over the secondary cooling coil 182 and the secondary heater coil 186.

A first connection assembly 160A is a refrigerant connection assembly 160A fluidly coupling the evaporator coils 32 of the universal base unit 20 via the open-circuit refrigerant lines 44A. If the universal base unit 20 is configured to provide heating via heated fluid as shown in the illustrated construction, the front box kit 150 further includes a second connection assembly 160B fluidly coupling multiple heater coils 40 (FIG. 3). If the universal base unit 20 is not provided with fluid-circulating heater coils 40, the front box kit 150 may be provided with only the refrigerant connection assembly 160A. The refrigerant connection assembly 160A includes a plurality of refrigerant tubes 170 in addition to a sight glass 171, a tank receiver 172, a filter-drier 173 (flanked by a pair of valves 174), and a pair of fittings 175 for coupling to the remote compressor 52. The refrigerant connection assembly 160A also includes a front box connection 176. A first additional refrigerant line 177 (i.e., liquid line to supply liquid refrigerant to the coil 182) and a second additional refrigerant line 178 (i.e., suction line to draw refrigerant from the coil 182 of the front box 155) are coupled to the refrigerant tubes 170. The heating fluid connection assembly 160B includes connection lines 179 for coupling multiple heater coils 40 of the universal base unit 20 via the open-circuit lines 44B. If the secondary heater 186 is a fluid-circulating heater coil, the connection lines 179 are also coupled to the secondary heater 186 (e.g., via connectors such as soldered copper piping, hoses, etc.) to circulate heating fluid therethrough. With the exception of the additional refrigerant lines 177, 178 coupled to the coil 182 of the front box 155 via the refrigerant tubes 170, and connectors coupling the heating connection lines 179 to the secondary heater 186 (which are only provided if the secondary heater 186 is a fluid-circulating heating coil and not an electric heater), the connection assemblies 160A, 160B may be nearly or entirely identical to the respective connection assemblies 60A, 60B of the simple connection kit 50.

In the illustrated construction, the frame includes a bracket 166A coupled with (e.g., clamped onto) the refrigerant connection assembly 160A and a bracket 166B coupled with (e.g., clamped onto) the heating fluid connection assembly 160B. The brackets 166A, 166B are coupled with the frame 24 of the universal base unit 20 so that the refrigerant connection assembly 160A and the heating fluid connection assembly 160B are supported by the frame 24 of the universal base unit 20. In the illustrated construction, the frame of the front box kit 150 includes a pair of additional brackets 166C, 166D adjacent the refrigerant connection assembly 160A that couple the first cover 162 to the frame 24 of the universal base unit 20. For example, the additional brackets 166C, 166D are fastened to an end (e.g., on or adjacent an exposed external end face) of the universal base unit frame 24 in the illustrated construction. The bracket 166A for the refrigerant connection assembly 160A is coupled indirectly to the universal base unit frame 24 via at least one of the additional brackets 166C, 166D (bracket 166C in FIGS. 4 and 5). On an opposing end of the universal base unit 20, the bracket 166B for the heating fluid connection assembly 160B is coupled directly to the end of the frame 24 (e.g., on or adjacent an exposed external end face). The second cover 164 can be coupled to the frame 24 directly, through the bracket 166B for the heating fluid connection assembly 160B, or through another bracket or mounting arrangement that fixes the position of the second cover 164 relative to the universal base unit 20. The front box 155 itself may also be considered as part of the frame of the front box kit 150. The front box 155 is secured to the frame 24 of the universal base unit 20 with two additional brackets 166E, 166F. The box-mounting brackets 166E, 166F may be elongated as shown in the illustrated construction, and may extend into the universal base unit 20 to overlap with the frame 24 by a length that is at least as great as a length of extension of the box 155 from the universal base unit 20 in the direction of extension of the brackets 166E, 166F. With the exception of the box-mounting brackets 166E, 166F, the frame of the front box kit 150 may be nearly or entirely identical to the frame of the simple connection kit 50.

Attachment of the front box kit 150 onto the universal base unit 20 to construct an air conditioning system of a second type as shown in FIG. 8 is described below. The refrigerant connection assembly 160A is coupled with the open-circuit refrigerant lines 44A of the universal base unit 20 to define continuous flow paths therebetween. When heating is provided by fluid-circulating heater coils 40 rather than electric heating, connection lines 179 of the heating fluid connection assembly 160B are coupled with the open-circuit lines 44B of the universal base unit 20. In the illustrated construction, the refrigerant connection assembly 160A and the heating fluid connection assembly 160B are coupled with the respective open-circuit lines 44A, 44B at opposing ends of the universal base unit 20. The brackets 166A-D are mounted to the frame 24 of the universal base unit 20 to support the connection assemblies 160A, 160B. The first and second covers 162, 164 are mounted to abut the universal base unit 20 and cover the refrigerant connection assembly 160A and the heating fluid connection assembly 160B, respectively. In some constructions, only a single cover may be used. The cover(s) of the front box kit 150 may be configured to integrate with (i.e., conform to or abut with) the side covers 38 of the universal base unit 20.

Figure 9:
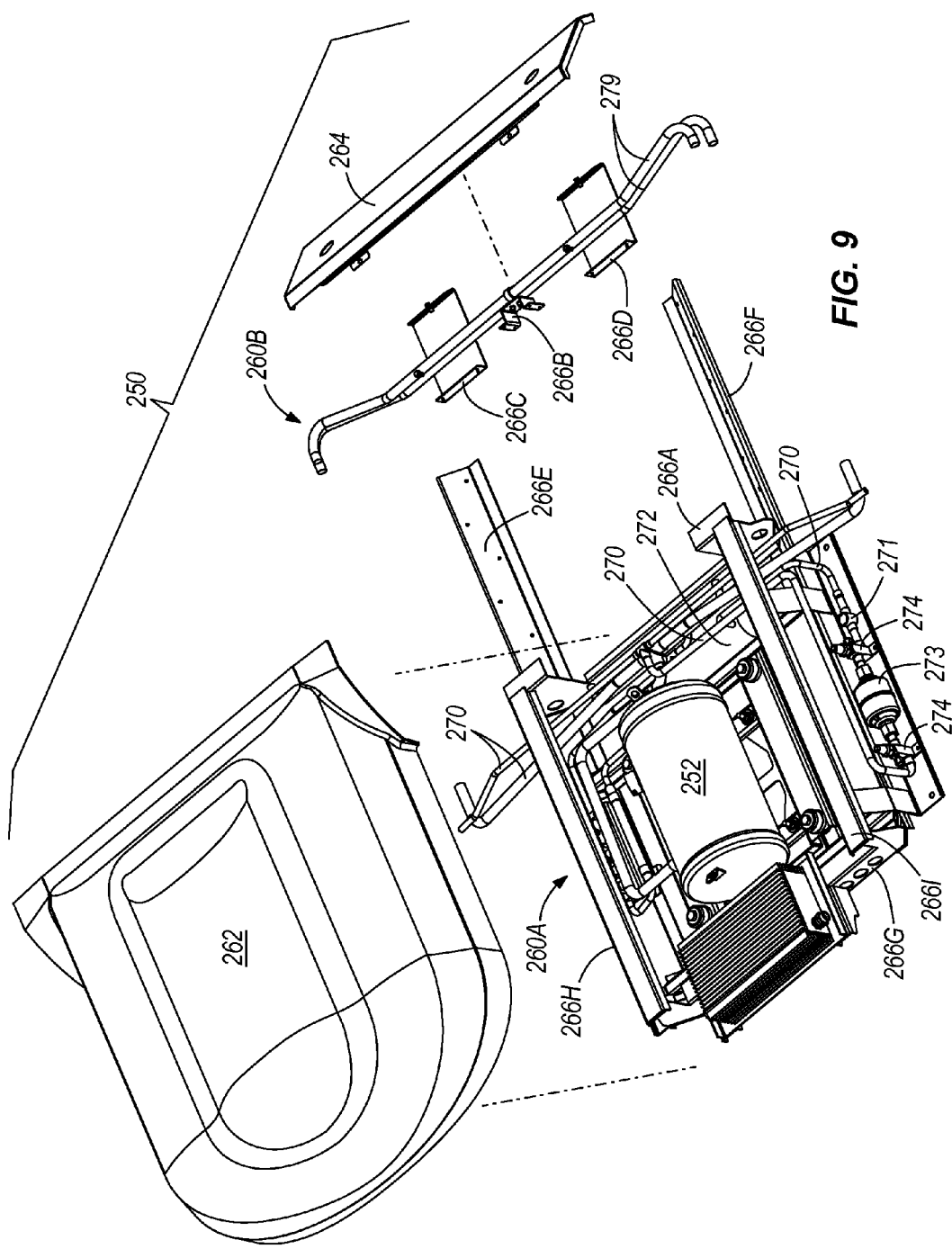
FIG. 9 is a perspective view of a group of components making up a compressor kit for attachment onto the universal base unit of FIGS. 2-3.
Figure 10:
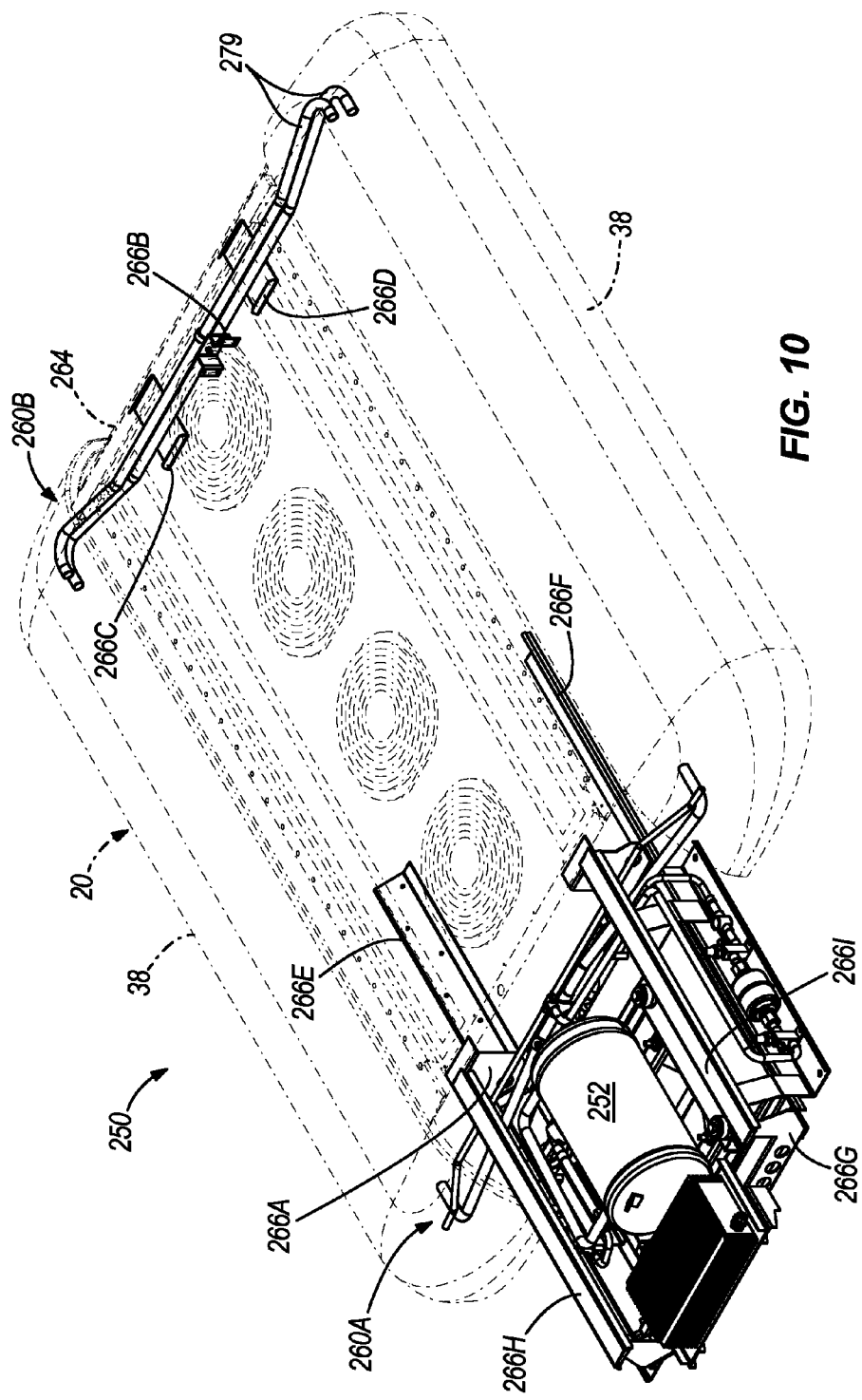
FIG. 10 is a perspective view of the compressor kit assembled with the universal base unit of FIGS. 2-3 to form an air conditioning system with an on-board compressor.

A third completion kit is described with reference to FIGS. 9 and 10. The completion kit of FIGS. 9 and 10 is a compressor kit 250 for not only mating with the open-circuit fluid lines 44A, 44B of the universal base unit 20, but also for equipping the air conditioning system with an on-board compressor 252 (e.g., an electrically-driven hermetic compressor). As shown in FIGS. 9 and 10, the compressor kit 250 includes at least one connection assembly 260A, 260B, a first cover 262, a second cover 264, and a frame including one or more frame members 266A-I supporting at least the on-board compressor 252.

The first connection assembly 260A is a refrigerant connection assembly fluidly coupling the evaporator coils 32 of the universal base unit 20 via the open-circuit refrigerant lines 44A. If the universal base unit 20 is configured to provide heating via heated fluid as shown in the illustrated construction, the kit 250 further includes a second connection assembly 260B fluidly coupling multiple heater coils 40 (FIG. 3). If the universal base unit 20 is not provided with fluid-circulating heater coils 40, the kit 250 may be provided with only the refrigerant connection assembly 260A. The refrigerant connection assembly 260A includes the compressor 252 and a plurality of refrigerant tubes 270 for fluidly coupling the refrigerant connection assembly 260A, including the compressor 252, to the universal base unit 20. The compressor 252 can be supported on sound-deadening vibration absorption blocks, or "silent blocks". The flow of refrigerant through the compressor 252 can be varied with a controlled stepper valve. Thermal insulation sleeves may be wrapped around some or all of the refrigerant tubes 270 adjacent the compressor 252. Similar to the refrigerant connection assemblies 60A, 160A of FIGS. 4-8, the refrigerant connection assembly 260A includes a sight glass 271, a tank receiver 272, and a filter-drier 273 (flanked by a pair of valves 274). These components are arranged in a unique configuration to maximize space efficiency. The refrigerant connection assembly 260A can also include a front box connection (not shown).

The heating fluid connection assembly 260B includes connection lines 279 for coupling multiple heater coils 40 of the universal base unit 20 via the open-circuit lines 44B. Although the refrigerant connection assembly 260A has a significantly different arrangement from the connection assemblies 60A, 160A of FIGS. 4-8 to accommodate the on-board compressor 252, the heating fluid connection assembly 260B may be nearly or entirely identical to the heating fluid connection assemblies 60B, 160B of the simple connection kit 50 and the front box kit 150.

In the illustrated construction, the frame includes a first bracket 266A provided at the proximal end of the refrigerant connection assembly 260A adjacent the location where the refrigerant connection assembly 260A couples to the universal base unit 20. Additional side brackets 266H, 266I are coupled to the first bracket 266A and extend to a distal end of the refrigerant connection assembly 260A. A connecting bracket 266G spans the side brackets 266H, 266I at the distal end such that the brackets 266A, 266H, 266I, 266G form a box-like frame assembly that surrounds the compressor 252 and is secured to the frame 24 of the universal base unit 20 with two brackets 266E, 266F. These brackets 266E, 266F may be elongated as shown in the illustrated construction, and may extend into the universal base unit 20 to overlap with the frame 24 by a length that is approximately the same as a length of extension of the refrigerant connection assembly 260A from the universal base unit 20 in the direction of extension of the brackets 266E, 266F. The brackets 266E, 266F are coupled with the frame 24 of the universal base unit 20 so that the refrigerant connection assembly 260A is supported by the frame 24 of the universal base unit 20.

On an opposing end of the universal base unit 20, a bracket 266B is coupled with (e.g., clamped onto) the heating fluid connection assembly 260B and coupled directly to the end of the frame 24 (e.g., on or adjacent an exposed external end face). The second cover 264 can be coupled to the frame 24 via two brackets 266C, 266D adjacent the bracket 266B. Alternatively, the second cover 264 can be mounted through the bracket 266B of the heating fluid connection assembly 260B, or through another bracket or mounting arrangement that fixes the position of the second cover 264 relative to the universal base unit 20. In the illustrated construction, the brackets 266C, 266D are fastened directly to an end (e.g., on or adjacent an exposed external end face) of the universal base unit frame 24.

Attachment of the compressor kit 250 onto the universal base unit 20 to construct an air conditioning system of a third type as shown in FIG. 10 is described below. The refrigerant connection assembly 260A is coupled with the open-circuit refrigerant lines 44A of the universal base unit 20 to define continuous flow paths therebetween. When heating is provided by fluid-circulating heater coils 40 rather than electric heating, the connection lines 279 of the heating fluid connection assembly 260B are coupled with the open-circuit lines 44B of the universal base unit 20. In the illustrated construction, the refrigerant connection assembly 260A and the heating fluid connection assembly 260B are coupled with the respective open-circuit lines 44A, 44B at opposing ends of the universal base unit 20. The brackets 266A-I are coupled directly or indirectly to the frame 24 of the universal base unit 20 to support the portions of the compressor completion kit 250. The first and second covers 262, 264 are mounted to abut the universal base unit 20 and cover the refrigerant connection assembly 260A and the heating fluid connection assembly 260B, respectively. In some constructions, only a single cover may be used. The cover(s) of the compressor kit 250 may be configured to integrate with (i.e., conform to or abut with) the side covers 38 of the universal base unit 20.

Figure 11:
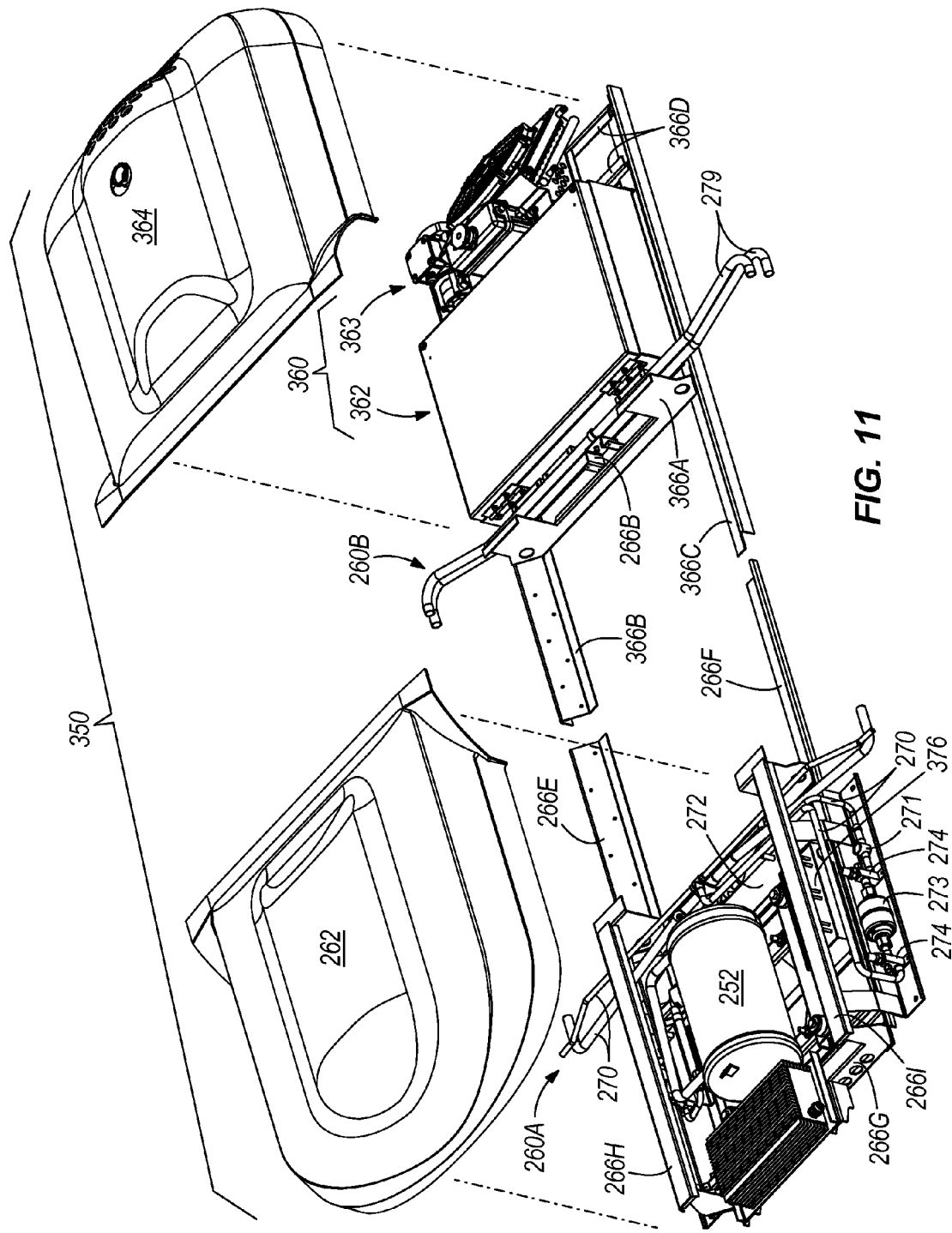
FIG. 11 is a perspective view of a group of components, including a power conversion unit, making up an alternator-powered compressor kit.
Figure 12:
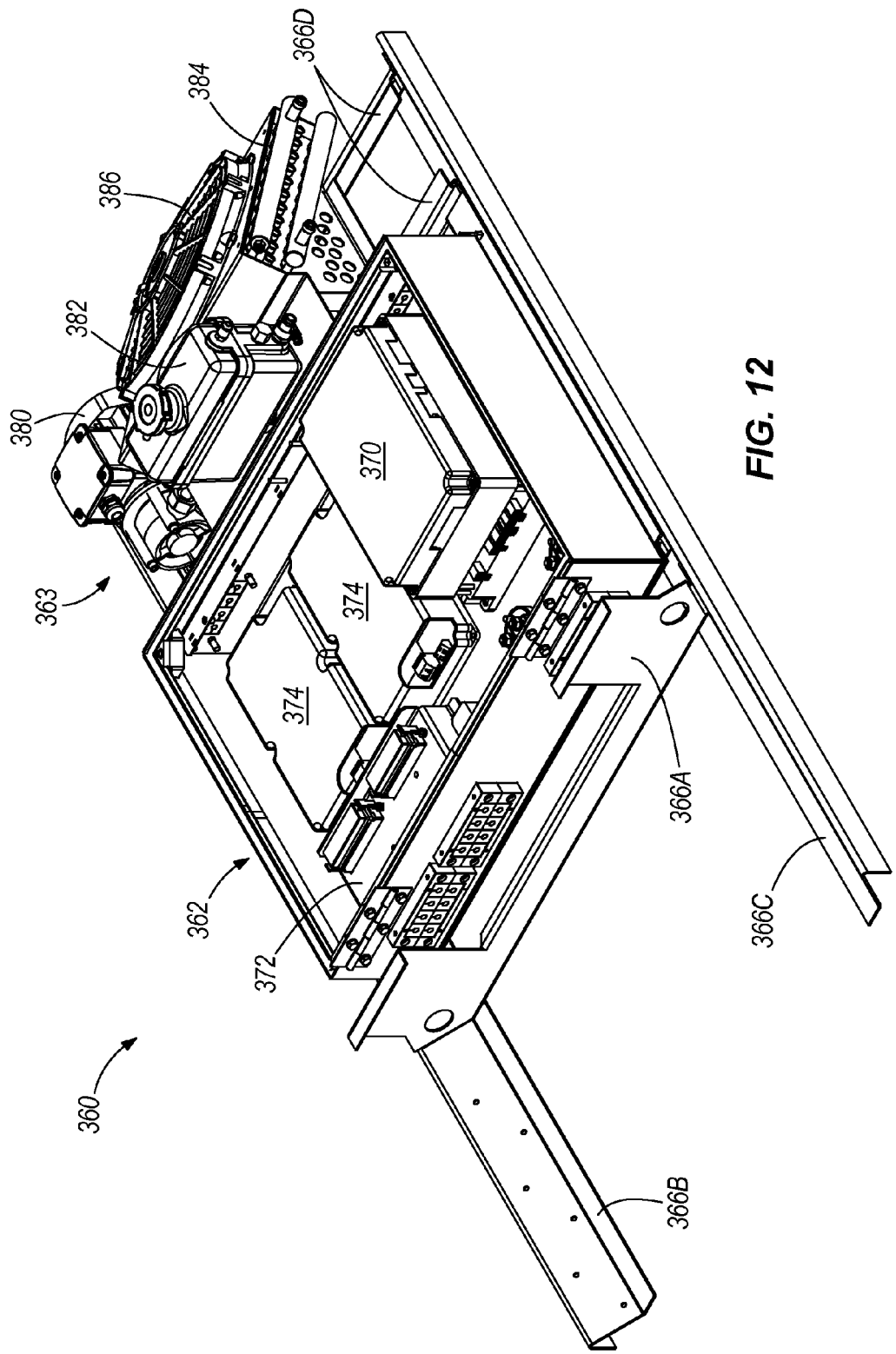
FIG. 12 is a detail perspective view of the power conversion unit of FIG. 11.
Figure 13:
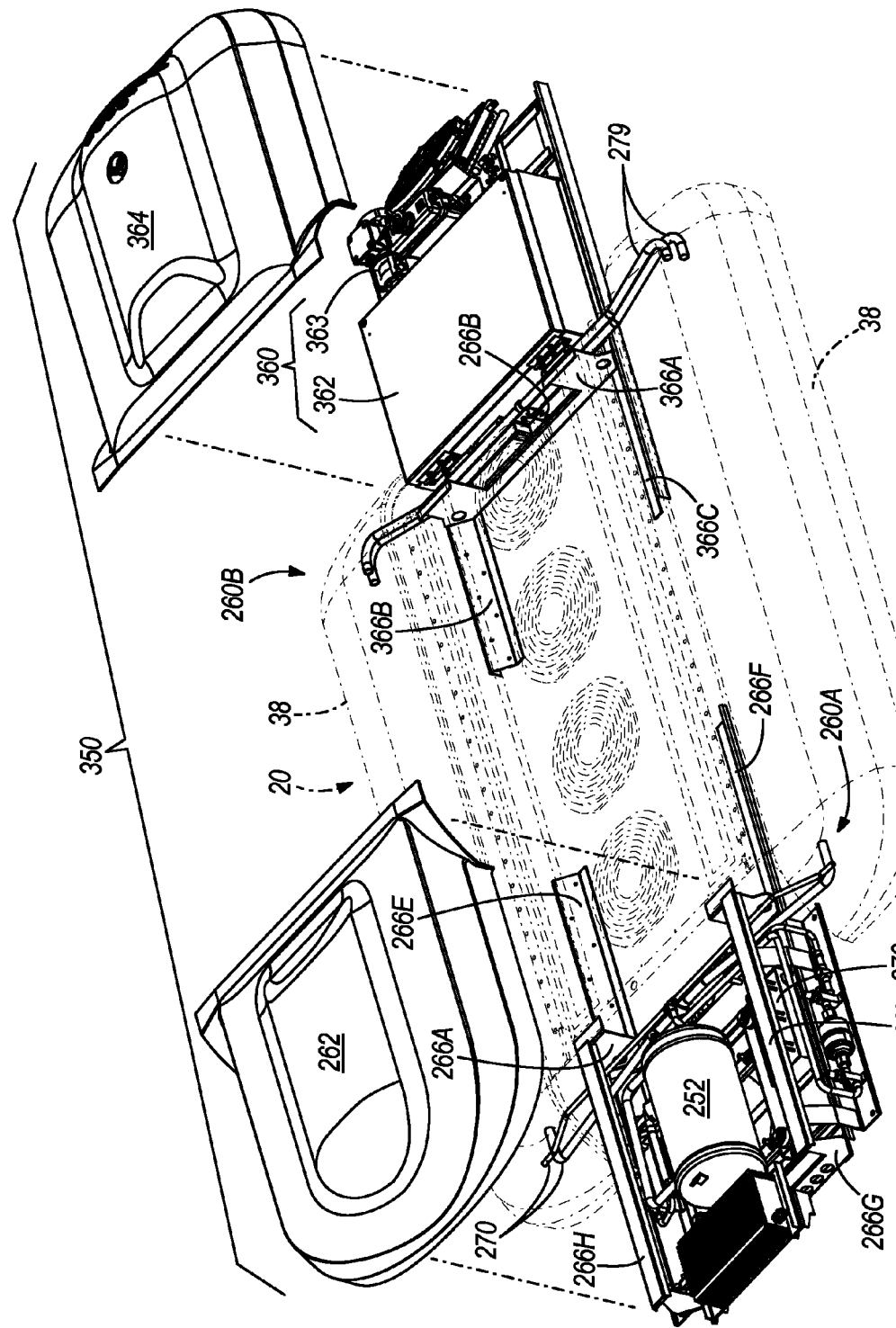
FIG. 13 is a perspective view of the alternator-powered compressor kit assembled with the universal base unit of FIGS. 2-3 to form an air conditioning system with an on-board alternator-powered compressor.

A fourth completion kit is described with reference to FIGS. 11-13. The completion kit 350 of FIGS. 11-13 is a modified version of the compressor kit 250 that not only equips the air conditioning system with the on-board compressor 252, but also provides for the compressor 252 to be operated by electrical power supplied by an alternator of the vehicle (not shown). Therefore, the alternator-powered compressor kit 350 includes most or all of the components of the third completion kit 250 including the refrigerant connection assembly 260A with the compressor 252, the frame (266A, 266E-I) and the cover 262 associated with the refrigerant connection assembly 260A, the heating fluid connection assembly 260B and associated bracket 266B, and in addition includes a power conversion unit 360 configured to receive a variable AC input from the alternator and provide a predetermined DC output to the compressor 252. A second cover 364 is provided over the power conversion unit 360, but in some constructions a single cover may be provided to cover both the compressor portion of the alternator-powered compressor kit 350 and the power conversion unit 360. The cover(s) of the alternator-powered compressor kit 350 may be configured to integrate with (i.e., conform to or abut with) the side covers 38 of the universal base unit 20.

The power conversion unit 360 includes a control box 362, a cooling system 363, and a frame supporting the control box 362 and the cooling system 363, configured to couple the power conversion unit 360 to an end of the universal base unit 20 opposite an end where the compressor 252 is positioned. As shown in FIGS. 11-13, the frame of the power conversion unit 360 includes a first bracket 366A configured to extend along the heating fluid connection assembly 260B. The first bracket 366A is coupled between two additional brackets 366B, 366C, which are parallel and elongated in a direction of extension parallel to the brackets 266E, 266F that support the compressor 252. Similar to the brackets 266E, 266F, the brackets 366B, 366C of the power conversion unit 360 extend into the universal base unit 20 to couple directly to the frame 24. In the illustrated construction, the brackets 366B, 366C extend a length into the universal base unit 20 about equal to the outward projecting length of the power conversion unit 360 from the universal base unit 20. One or more additional brackets 366D at the distal end of the power conversion unit 360 brace the parallel brackets 366B, 366C. Although the control box 362 may include an integral cover or lid, the control box 362 and the cooling system 363 are covered by the second cover 364, which can be supported directly by the power conversion unit 360 (e.g., a bracket of the frame supporting the power conversion unit 360), or directly by the universal base unit 20.

FIG. 12 illustrates the interior of the control box 362 and the details of the cooling system 363. The control box 362 includes a static converter 370, an EMC filter 372, and a pair of DC modules 374. A commutation choke 376 can be added adjacent the compressor 252 as shown in FIGS. 11 and 13. The static converter 370 converts input supply voltage to the requested output. The EMC filter 372 prevents electromagnetic disturbance. The DC module 374 converts output AC voltage to DC voltage. The commutation choke 376 provides a standby option. The cooling system 363 is positioned adjacent the control box 362 and includes a water pump 380, an expansion tank 382, a cooler 384, and a fan 386.

By providing the universal base unit 20 as an incomplete air conditioning system with open-circuit lines at exterior portions thereof, the base unit 20 is truly universal and can be built-out into any one of a plurality of different configurations by the addition of at least one completion kit, including but not limited to those described in detail herein. Thus, only a single universal base unit 20 is required to meet a vast variety of differently-configured air conditioning systems, and specialized parts are minimized.

Various features and advantages of the invention are set forth in the following claims.

What is claimed is:

1. A method of constructing modular air conditioning systems for vehicles, the method comprising:
providing a plurality of identical universal base units each including a frame, a condenser, an evaporator coil, and a blower, each universal base unit including open-circuit refrigerant lines such that the universal base units are themselves non-operational;
providing at least two of the following types of completion kits:
a connection kit connectable with any of the plurality of universal base units and including open-circuit refrigerant connection lines complementary with the open-circuit refrigerant lines of one of the universal base units to define continuous flow paths therebetween, the connection kit equipping one of the universal base units to operate with a remote compressor, a front box kit connectable with any of the plurality of universal base units and including open-circuit refrigerant connection lines complementary with the open-circuit refrigerant lines of one of the universal base units to define continuous flow paths therebetween, the front box kit including a secondary cooling coil, and a secondary blower, and a compressor kit connectable with any of the plurality of universal base units and including open-circuit refrigerant connection lines complementary with the open-circuit refrigerant lines of one of the universal base units to define continuous flow paths therebetween, the compressor kit including an electrically-driven compressor;

attaching a first one of the provided completion kits onto a first one of the plurality of universal base units to construct a first air conditioning system of a first type; and attaching a second one of the provided completion kits onto a second one of the plurality of universal base units to construct a second air conditioning system of a second type.

2. The method of claim 1, further comprising providing all three types of completion kits, and constructing a third air conditioning system of a third type with the third one of the provided completion kits.

3. The method of claim 1, wherein attaching the first and second completion kits onto the first and second universal base units of the plurality of universal base units includes attaching the first and second completion kits onto at least one exterior surface of the respective universal base units such that the first and second completion kits extend therefrom.

4. The method of claim 1, wherein each of the plurality of identical universal base units further includes a fluid-circulating heater coil and open-circuit heating fluid lines coupled to the heater coil, the method further comprising attaching the open-circuit refrigerant connection lines of the first and second completion kits to respective first ends of the first and second universal base units, and attaching heating fluid connection lines of the first and second completion kits to respective seconds ends of the first and second universal base units, the second ends opposing the respective first ends.

5. The method of claim 1, wherein each completion kit includes at least one cover, the method further comprising abutting the at least one cover of each of the first and second completion kits with the first and second universal base units.

6. The method of claim 1, wherein one of the first and second provided completion kits is the connection kit, and wherein the connection kit further includes at least one cover, and the attaching of connection kit onto one of the plurality of universal base units includes coupling the open-circuit refrigerant connection lines of the connection kit to the open-circuit refrigerant lines of the universal base unit and coupling the at least one cover to the universal base unit.

7. The method of claim 1, wherein the front box kit includes at least one cover, and a frame supporting the secondary cooling coil and the secondary blower, wherein one of the first and second provided completion kits is the front box kit, and the attaching of the front box kit onto one of the plurality of universal base units includes coupling the open-circuit refrigerant connection lines of the front box kit to the open-circuit refrigerant lines of the universal base unit and coupling the frame of the front box kit to the frame of the universal base unit.

8. The method of claim 7, wherein each of the plurality of identical universal base units further includes a fluid-circulating primary heater coil and open-circuit heating fluid lines coupled to the primary heater coil, and wherein the front box kit is provided with a secondary heater coil, the method further comprising fluidly coupling the secondary heater coil with the primary heater coil with heating fluid connection lines of the front box kit.

9. The method of claim 1, wherein, in addition to the compressor, the compressor kit is provided with at least one cover, and a frame supporting at least the compressor, wherein one of the first and second provided completion kits is the compressor kit, and the attaching of the compressor kit onto one of the plurality of universal base units includes coupling the open-circuit refrigerant connection lines of the compressor kit to the open-circuit refrigerant lines of the universal base unit and coupling the frame of the compressor kit to the frame of the universal base unit.

10. The method of claim 1, further comprising providing an alternator-powered compressor kit connectable with any of the plurality of universal base units and including open-circuit refrigerant connection lines complementary with the open-circuit refrigerant lines of one of the universal base units to define continuous flow paths therebetween, and attaching the alternator-powered compressor kit onto a third one of the plurality of universal base units to construct an air conditioning system with an alternator-powered integrated compressor.

11. The method of claim 10, wherein the alternator-powered compressor kit is provided with an electrically-driven compressor, a power conversion unit configured to receive a variable AC input from an alternator and provide a predetermined DC output to the compressor, at least one cover, and at least one frame supporting the compressor and the power conversion unit, the attaching of the alternator-powered compressor kit onto the third universal base unit including coupling the open-circuit refrigerant connection lines of the alternator-powered compressor kit to the open-circuit refrigerant lines of the third universal base unit and coupling the at least one frame of the alternator-powered compressor kit to the frame of the third universal base unit.

12. The method of claim 11, wherein the alternator-powered compressor kit includes a first frame supporting the electrically-driven compressor and a second frame supporting the power conversion unit, the coupling of the at least one frame of the alternator-powered compressor kit to the frame of the universal base unit including coupling both the first and second frames of the alternator-powered compressor kit to the frame of the third universal base unit.

13. The method of claim 12, further comprising separately coupling the first and second frames of the alternator-powered compressor kit to two opposing ends of the frame of the third universal base unit.

14. The method of claim 1, further comprising providing each of the plurality of universal base units with a heater.

* * * * *